Patented Jan. 29, 1952

2,583,569

UNITED STATES PATENT OFFICE 2,583,569

PRODUCTION OF A NEW COMPOSITION OF MATTER

Simon H. Herzfeld and Morton Kleiman, Chicago, Ill., assignors to Velsicol Corporation, Chicago, Ill., a corporation of Illinois No Drawing. Application June 28, 1950, Serial No. 170,952

5 Claims. (Cl. 260—348)

This invention relates to a new composition of matter and to a method of production thereof.

This application is a continuation-in-part of our copending application Serial No. 40,153, filed July 22, 1948, now Patent No. 2,528,654, November 7, 1950.

More specifically, this invention relates to the preparation of a material having the structural formula:

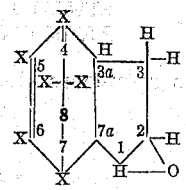

wherein X is a halogen of the group consisting of chlorine bromine and mixtures thereof.

According to "The Ring Index" by Patterson and Capell, A. C. S. Monograph Series, No. 84, 1940, dicyclopentadiene, $C_{10}H_{12}$, is described as 4,7-methano-3$a$,4,7,7$a$-tetrahydroindene. Following this accepted system of nomenclature, the compound above represented by structural formula can be described (assuming the halogen atoms are all chlorine) as 1,2-epoxy-4,5,6,7,8,8-hexachloro-4,7-methano-3$a$,4,7,7$a$-tetrahydroindane.

Briefly, the process herein disclosed involves the oxidation of the cyclopentene ring in the Diels-Alder adduct of hexahalocyclopentadiene and cyclopentadiene (4,5,6,7,8,8-hexahalo-4,7-methano-3$a$,4,7,7$a$-tetrahydroindene) to result in the epoxide above represented by structural formula. The reaction, starting with the materials hexahalocyclopentadiene and cyclopentadiene may be represented as follows:

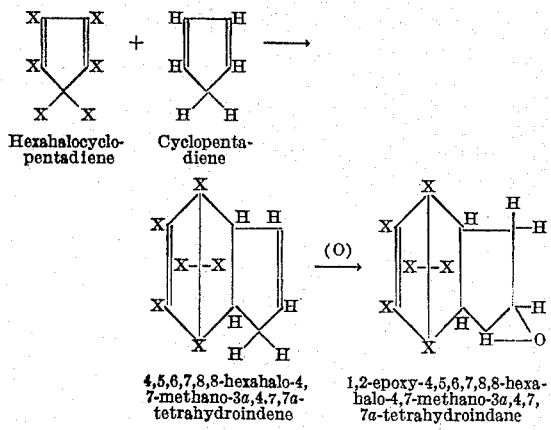

4,5,6,7,8,8-hexahalo-4,7-methano-3$a$,4,7,7$a$-tetrahydroindene 1,2-epoxy-4,5,6,7,8,8-hexahalo-4,7-methano-3$a$,4,7,7$a$-tetrahydroindane The Diels-Alder adduct of a hexahalocyclopentadiene and cyclopentadiene, the structure and name of which have been previously mentioned, and the method for making same has been disclosed and claimed in the copending application of Herzfeld, Lidov and Bluestone, Serial No. 639,416, filed January 5, 1946.

For the purpose of clarity and brevity only the Diels-Alder adduct of hexachlorocyclopentadiene and cyclopentadiene will be hereinafter referred to, although it is expressly understood that the adduct formed from hexabromocyclopentadiene or a mixed hexachloro-bromocyclopentadiene is fully applicable to the process of this invention. Further, the above mentioned adduct of hexachlorocyclopentadiene and cyclopentadiene will hereinafter be referred to as chlordene.

The oxidation of chlordene to the epoxide derivative thereof may be effected, for example, by treating chlordene with an organic per-acid such as perbenzoic, peracetic, or mono-perphthalic acid. It is preferred that any mineral acid, such as free sulfuric acid, which may be present in the organic per-acid be neutralized with an alkaline material such as sodium acetate. The reason for this is that free mineral acid may tend to cause the breaking of the epoxide ring structure thereby decreasing the yield of desired product.

Normal room temperature or slightly elevated temperatures, such as about 50° C. are very satisfactory for the production of the product of this invention. It is further preferred that a molar excess of organic per-acid be utilized.

A specific example of the oxidation of chlordene with an organic per-acid to produce 1,2-epoxy-4,5,6,7,8,8-hexachloro-4,7-methano-3$a$,4,7,7$a$-tetrahydroindane, having the structure indicated previously, is hereinafter noted for the purpose of illustration.

Example

To a stirred solution of 34.0 grams (0.1 mole) of chlordene in 200 ml. of acetic acid was added in a dropwise manner, 24.0 ml. (0.15 mole) of 40% peracetic acid in which the free sulfuric acid had previously been neutralized with 0.5 grams of sodium acetate. The mixture was heated to between 34 and 40° C. for four hours and was then allowed to stand at room temperature for 48 hours. The reaction mixture was poured into 1500 ml. of ice water; the solid product which precipitated was filtered and dissolved in pentane. The pentane solution was washed with water and dried over calcium chloride. The dried pentane solution containing the desired product was percolated through a column of 200 grams adsorption alumina (80-200 mesh). The pentane eluate contained chlordene as well as some epoxide. The remainder of the epoxide remained in the column and was readily eluted with diethyl ether. The ether solution of the thus purified, desired product was evaporated to dryness and the residue was then recrystallized from pentane. A subsequent recrystallization from methanol resulted in a pure product melting at 231-233° C. An analysis of this product showed it to be the desired epoxide of chlordene.

Calculated for $C_{10}H_6Cl_6O$: C = 33.84; H = 1.70; Cl = 59.94.

Found for product prepared above: C = 33.74; H = 1.84; Cl = 59.90, 59.92.

The new product of the present invention is valuable for use in the control and destruction of insects. The product of this invention is also useful as an intermediate in the preparation of other insecticidal compositions derived from the present parent compound by hydrolysis of the epoxy ring structure to form a glycol and/or by further halogenation, etc. Highly halogenated derivatives of the present product are also useful as impregnants, fireproofing agents, and the like.

We claim as our invention:

1. A new composition of matter having the structural formula

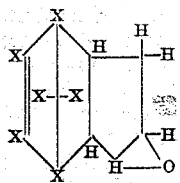

wherein X is a halogen of the group consisting of chlorine and bromine and all of the X's are the same.

2. A new composition of matter having the structural formula

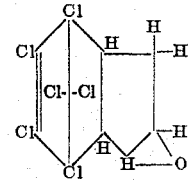

3. The method of forming 1,2-epoxy-4,5,6,7,8,8-hexahalo-4,7-methano - 3a,4,7,7a - tetrahydroindane wherein the halogen atoms are the same and are of the group consisting of chlorine and bromine which comprises oxidizing the cyclopentene ring containing carbon atoms 1,2,3,3a and 7a of 4,5,6,7,8,8 - hexahalo - 4,7 - methano-3a,4,7,7a-tetrahydroindene, with an organic peracid.

4. The method of claim 3 where the 4,5,6,7,8,8-hexahalo-4,7-methano - 3a,4,7,7a - tetrahydroindene is 4,5,6,7,8,8 - hexachloro - 4,7 - methano-3a,4,7,7a-tetrahydroindene.

5. The method of claim 3 where the organic peracid is peracetic acid.

SIMON H. HERZFELD.
MORTON KLEIMAN.

No references cited.